United States Patent [19]

Vonasek et al.

[11] Patent Number: 5,781,214

[45] Date of Patent: Jul. 14, 1998

US005781214A

[54] METHOD OF PREVENTING CLOGGING OF NOZZLES

[75] Inventors: Jiri Vonasek, deceased, late of Kungälv, Sweden, by Tor Erik Nygren, executor; Mats Tuniuns; Klas Rydinge, both of Göteborg, Sweden

[73] Assignee: Markpoint Development AB, Goteborg, Sweden

[21] Appl. No.: 861,758

[22] Filed: May 22, 1997

Related U.S. Application Data

[63] Continuation of Ser. No. 374,571, filed as PCT/EP93/02005, Jul. 27, 1993, published as WO94/03546, Feb. 17, 1994, abandoned.

[30] Foreign Application Priority Data

Jul. 28, 1992 [SE] Sweden ............... 9202243

[51] Int. Cl.$^6$ ........................................ B41J 2/01
[52] U.S. Cl. .................................. 347/95; 347/101
[58] Field of Search ....................... 347/100, 95, 101, 347/105

[56] References Cited

U.S. PATENT DOCUMENTS 4,791,165  12/1988  Bearss ........................ 347/100

4,961,785  10/1990  Skene et al. ............... 106/22 D

FOREIGN PATENT DOCUMENTS

| 49-023860 | 6/1974 | Japan . |
| 55-066976 | 5/1980 | Japan . |
| 55-066977 | 5/1980 | Japan . |
| 1263165 | 10/1989 | Japan . |

*Primary Examiner*—Valerie Lund
*Attorney, Agent, or Firm*—Birch, Stewart, Kolasch & Birch, LLP

[57] ABSTRACT

A method of preventing clogging of nozzles, particularly nozzle orifices in a drop-on-demand ink jet printers, during intervals when no ink flows through the nozzles, e.g. during non-printing intervals, when using an ink composition intended for recording permanent information on essentially non-absorbent surfaces. The ink composition is made up of a solvent, a non- or low-volatile fraction and a colorant. The relative quantities and solubility of the constituents are selected such that when printing terminates and a portion of the solvent evaporates at the nozzle orifice, a concentration of colorant and less volatile fraction builds up in the region of the nozzle orifice. This causes the colorant to migrate to an environment in which its affinity is greater, i.e. further within the nozzle.

5 Claims, No Drawings

METHOD OF PREVENTING CLOGGING OF NOZZLES

This application is a continuation of PCT application Ser. No. 08/374,571, filed as PCT/EP93/02005, /Jul. 27, 1993 published as WO94/03546, Feb. 17, 1994 now abandoned.

TECHNICAL FIELD

The present invention relates to a method of preventing clogging of nozzles, particularly nozzle outlets in drop-on-demand ink jet printers, during intervals when no ink flows through the nozzles, e.g. during non-printing intervals, when using an ink intended for recording permanent information on essentially non-absorbent surfaces.

BACKGROUND OF THE INVENTION

There are at present two basic types of ink-jet printer on the market, i.e. continuous flow ink-jet printers and drop-on-demand ink-jet printers. In continuous flow printers, ink droplets are continuously emitted from a nozzle without regard as to whether or not a printing operation is performed. The ink droplets are charged in accordance with print information data and are deflected in response to the amount of charge carried thereon as they pass through a constant high-voltage field. The thus deflected ink droplets are deposited onto a recording surface whilst the ink droplets not contributive to the actual printing operation are directed towards a beam gutter for recirculation. Since the ink droplets flow continuously through the nozzle, the risk of ink drying out and clogging the nozzle does not arise. Of course, a portion of the solvent included within the ink liquid is unavoidably decreased due to volatilizing while the ink droplets travel through the air from the nozzle to the beam gutter, though this problem is normally addressed by monitoring the viscosity of the ink and adding solvent as required.

In drop-on-demand printers, the print head comprises a number of individual ink channels. In one type of drop-on-demand printer, the channels are supplied with ink under pressure and the ink is maintained within the channels by valves which open in response to print information. In a more recent development, these channels are formed in a piezoelectric wafer, and ink issuance is achieved by applying a voltage pulse to electrodes across each channel to cause a volume reduction of the channel, thereby expelling the ink within the channel. In this latter type of drop-on-demand printer, no valve componentry is required in the print head. In both types of drop-on-demand printer, when a certain character is to be generated on a recording surface, ink droplets are issued from those channels whose grouping forms the desired character. Thus, only those ink droplets which form the character are emitted.

Because there is no continuous flow of ink through the nozzles in drop-on-demand printers, significant problems arise from the ink drying out in the nozzle orifice, i.e. solvent content of the ink volatilizing, during non-printing intervals due to the ink's exposure to air. In print heads provided with valve means, this exposure to air is a result of ink leakage past the valves and the drying out often leads to clogging of the nozzles. Solutions to this problem include providing the valves with higher quality seals and terminating the ink supply to the print head during non-printing intervals so as to reduce the pressure across the valves. Clearly, these solutions cannot be incorporated in piezoelectric-wafer type print heads since these have no valve components, with the nozzles being direct extensions of the liquid channels. In order to prevent the ink from drying out too quickly, an ink having a low-volatile solvent is used. This however implies that the ink projected onto the recording surface will be slow-drying, an undesirable property which has led to the high popularity of continuous-jet printers with their fast-drying ink.

A further limitation to the type of ink which may be used in print heads of the type with channels formed in a piezoelectric wafer is that materials used in the print head, particularly for the electrode coating and the bonding of the wafer to its support plate, may often be adversely influenced by certain types of ink. Recent developments by the present applicant in this field has led to piezoelectric print heads of virtually inorganic material which is selected so as to have a very high resistance to chemicals. Accordingly, the previous constraints as to the ink make-up have been eased somewhat.

A need also exists for a method of operating drop-on-demand type ink-jet printers without clogging when using an ink which is suitable for recording permanent information on essentially non-absorbent surfaces. Ink compositions are known per se, e.g. from JP 74023860-B and JP 71040294-B, which are used in writing instruments such as pens for writing on non-absorbent surfaces. Such inks are, however, intended to be easily removable from the surfaces.

SUMMARY OF THE INVENTION

It is therefore an object of the present invention to provide a method of preventing nozzle outlet clogging in drop-on-demand type ink-jet printers during non-printing intervals.

It is a further object to enable such a method to be practised when using fast-drying ink suitable for permanently recording information on essentially non-absorbent surfaces.

These objects are achieved in accordance with the present invention by a method of preventing clogging of nozzles in ink jet printers during intervals when no ink flows through the nozzles, which comprises employing an ink composition intended for recording permanent information on essentially non-absorbent surfaces, said ink composition comprising:

(a) at least one solvent;

(b) a non-, or low volatile liquid or solution miscible to a certain extent in said at least one solvent (a), and (c) at least one colorant which is soluble and/or dispersible in a mixture of (a) and (b), but insoluble in (b) solely; the relative quantities of components (a), (b) and (c) being chosen such that when flow is terminated in the nozzles and a portion of component (a) evaporates, a concentration of components (b) and (c) builds up in the nozzles, thereby causing component (c) to migrate further within the nozzles into an environment in which its affinity is greater.

In a preferred method according to the present invention the non-, or low volatile fraction at least partially miscible in said at least one solvent is one or more hygroscopic salts. Ink compositions containing hygroscopic salts are known per se from, for example, U.S. Pat. No. 4 389 503 and U.S. Pat. No. 4 352 901. Both these documents relate to inks for continuous flow ink-jet printers and the hygroscopic salt is included in the composition as an opacity enhancement. Ink compositions containing hygroscopic components for recording information on absorbent surfaces such as ordinary paper are known from, for example, JP 01263165-A, JP 01263166-A, JP 01263167-A, JP 01263168-A, JP 55065271-A, JP 55066976-A, JP 55066977-A, DE-A-2 755 773 and JP 51052004-A. A further ink composition is known from JP 02245074-A, though again this ink will only dry satisfactorily on an absorbent surface.

Preferred embodiments of the method according to the present invention are detailed in the dependent claims.

BEST MODE OF CARRYING OUT THE INVENTION

In order to realize the method according to the present invention, the ink used in the printer has three main constituents, i.e. one or more solvents, a non- or low-volatile fraction and at least one colorant. Where desirable, a binder may also be included. Suitable ink compositions for realizing the claimed method are given in the following examples in which all quantities are specified in terms of % mass.

EXAMPLE I

| Water | 0–15%, pref. 5% |
| --- | --- |
| Monoethyleneglycol | 5–20%, pref. 15% |
| Ethanol | 10–40%, pref. 25% |
| Methylethylketone | 0–50%, pref. 25% |
| Colorant: Pro Jet Black MEK* (10% CI Solvent Black 47** in MEK) | 10–60%, pref. 30% |

*ICI Colours and Fine Chemicals
**Hoechst AG, Fett-Schwarz HB 01

Mix the water, monoethyleneglycol, ethanol and methylethyl-ketone. Add this solution to the colorant preparation during stirring. Filter the mixture through a 0.5 µm filter.

EXAMPLE II

| Water | 0–15%, pref. 5% |
| --- | --- |
| Formamide | 5–20%, pref. 10% |
| 1-Propanol | 10–30%, pref. 30% |
| Methylethylketone | 40–70%, pref. 52% |
| Colorant: Duasyn Black A-RG VP 280* (CI Solvent Black 27) | 1–6%, pref. 3% |

*Hoechst AG Marketing pimente

Dissolve the colorant in the entire quantity of methylethylketone. Mix the water, formamide and 1-propanol. Add this solution to the colorant preparation during stirring. Filter the mixture through a 0.5 µm filter. cl EXAMPLE III

| Water | 0–15%, pref. 5% |
| --- | --- |
| Glycerol | 5–20%, pref. 15% |
| Ethanol | 10–40%, pref. 25% |
| Ethyl acetate | 40–70%, pref. 50% |
| Colorant: Savinyl Fire Red 3GLS* (CI Solvent Red 124) | 1–6%, pref. 5% |

*SANDOZ AG

Dissolve the colorant in the entire quantity of ethyl acetate. Mix the water, glycerol and ethanol. Add this solution to the colorant preparation during stirring. Filter the mixture through a 0.5 µm filter.

EXAMPLE IV

| Water | 1–10%, pref. 3% |
| --- | --- |
| Calcium chloride | 0.5–5%, pref. 2% |
| Ethanol | 15–45%, pref. 30% |
| Methylisobutylketone | 30–70%, pref. 58% |
| Poly(vinylacetate): Vinnapas B5** | 0–7%, pref. 3% |
| Colorant: Duasyn Black A-RG VP 280* | 1–6%, pref. 4% |

*Hoechst AG Marketing pimente
**Wacker-Chemie GmbH

Dissolve all the calcium chloride in the entire quantity of water. Add all the ethanol when the calcium chloride is dissolved. Filter the calcium chloride solution through a 0.2 µ filter so that a clear solution is obtained. Dissolve all the poly(vinylacetate) in the entire quantity of methylisobutylketone. Thereafter dissolve all the colorant in the poly(vinylacetate) solution. Add the entire calcium chloride solution to the colorant/binder solution during stirring. Filter the mixture through a 0.5 µm filter.

EXAMPLE V

| Water | 2–15%, pref. 5% |
| --- | --- |
| Monoethyleneglycol | 5–15%, pref. 10% |
| Ethanol | 10–40%, pref. 25% |
| Acetone | 40–70%, pref. 55% |
| Colorant: CI Solvent Black 47* | 2–8%, pref. 5% |

*Hoechst AG, Fett-Schwarz HB 01

Dissolve the colorant in the entire quantity of acetone. Mix the water, monoethyleneglycol and ethanol in a separate beaker. Add the colorant preparation during stirring. Filter the mixture through a 0.5 µm filter.

EXAMPLE VI

| Water | 2–15%, pref. 5% |
| --- | --- |
| Formamide | 5–20%, pref. 10% |
| 1-Propanol | 10–30%, pref. 30% |
| Methylethylketone | 40–70%, pref. 50% |
| Colorant: CI Pigment Black 7* | 3–8%, pref. 5% |

*Bayer AG, Schwarz 6B 7

Disperse the pigment in the total quantity of methylethylketone. Mix the water, formamide and propanol in a separate beaker. Add the pigment dispersion during stirring. Filter the mixture through a 0.5 µm filter.

EXAMPLE VII

| Triethanolamine | 10–20%, pref. 15% |
| --- | --- |
| Water | 70–90%, pref. 80% |
| Colorant: CI Direct Blue 199* | 2–8%, pref. 5% |

*Bayer AG, Levacell Fast Turquoise Blue BLN

Dissolve the colorant in the total quantity of water. Add the triethanolamine during stirring. cl EXAMPLE VIII

| Calcium chloride | 5–25%, pref. 10% |
| --- | --- |
| Water | 70–90%, pref. 85% |
| Colorant: CI Pigment Black 7* | 3–8%, pref. 5% |

*Bayer AG, Levanyl Schwarz BZ

Disperse the pigment in half the quantity of the water. Dissolve the calcium chloride in the other half of the water. Filter the calcium chloride solution through a 0.2 µm filter to obtain a clear solution. Mix the pigment dispersion and filtered calcium chloride solution during stirring.

EXAMPLE IX

| Calcium chloride | 5–25%, pref. 10% |
| --- | --- |
| Water | 70–90%, pref. 85% |
| Colorant: CI Basic Yellow 28* | 3–8%, pref. 5% |

*Bayer AG, Astrazon Golden Yellow GL FW

Dissolve the pigment in half the quantity of the water. Dissolve the calcium chloride in the other half of the water. Filter the calcium chloride solution through a 0.2 µm filter to obtain a clear solution. Mix the colorant solution and filtered calcium chloride solution during stirring.

During operation of a drop-on-demand ink-jet printer using an ink composition as described above, the quality of the ink deposited on the recording surface is virtually identical to that of continuous-jet inks, with comparably short drying times. Thus, when an ink droplet is deposited onto an absorbent surface, it will in most cases dry almost instantly due to absorption into the substrate. In the case where the recording surface is non-absorbent, the drying of the ink droplet is due to almost total volatilization of the solvent content, thereby rendering the colorant and any binder insoluble and causing these to be deposited on the surface. The non- or low volatile component of the ink thus forms a thin, uncoloured residue coating the dried, abrasion-resistant droplet. The entire drying time is a matter of seconds.

When the printing operation ceases, the solvent in the ink in the vicinity of the nozzle's orifice rapidly volatilizes, thereby creating a concentration of the less volatile fractions, including the colorant, in this region. It is the build-up of the generally heavy molecular colorant and binder which leads to the clogging of the nozzle when conventional inks are used in this type of printer. Due to the build up of concentration of the less volatile fractions, the solubility parameters of the forward phase of the ink are altered. In accordance with the present invention, by selecting the solid components of the ink, e.g. the colorant and any binder, such that their affinity is greater to the original ink composition, i.e. the ink composition before volatilization, the change in solubility parameters of the ink in the region of the nozzle's orifice causes the solid components to migrate back into the nozzle where ink of original composition is to be found.

In the most preferred composition of ink for use in the method according to the present invention, i.e. the ink of EXAMPLE IV, the less volatile fraction includes the hygroscopic salt calcium chloride. When the printing operation ceases, the solvent in the ink in the vicinity of the nozzle's opening rapidly volatilizes, thereby creating a concentration of the hygroscopic salt, water, binder and colorant in this region. In accordance with the present invention, the hygroscopic salt equilibrates with moisture in the surrounding atmosphere. Since the colorant is substantially insoluble in water, a boundary layer of hygroscopic water solution forms across the nozzle opening as the colorant seeks an environment in which its affinity is greater, i.e. further in within the nozzle where there is still a large quantity of solvent. Thus, at the nozzle orifice a barrier is eventually created consisting of a hygroscopic salt water solution in equilibrium with the moisture in the surrounding atmosphere, which solution acts as a diffusion block to hinder evaporation of the solvent. When a sufficient quantity of the solvent has evaporated, the colorant and binder separate out from the non- or low volatile component of the ink, which results in a clear liquid phase building up in the vicinity of the orifice. By careful selection of the proportions of substances in the ink, the balance of the liquid phase in the nozzle opening region is automatically maintained. In practice, it has been shown that the rate of further evaporation decreases logarithmically with time.

The present invention is not to be regarded as limited to that described above, but may be varied within the scope of the appended claims. For example, it will be apparent to the skilled person that the ink may contain additives in a manner known per se to enhance the ink's properties.

What is claimed is:

1. A method of preventing clogging of nozzles in ink jet printers during intervals when no ink flows through the nozzles, which comprises the steps of:

providing an essentially non-absorbent surface; and applying an ink composition intended for recording permanent information on the essentially non-absorbent surface, said ink composition comprising:

(a) at least one volatile organic solvent;

(b) a non-, or low volatile liquid or solution miscible to a certain extent in said at least one solvent (a), and (c) at least one colorant which is soluble and/or dispersible in a mixture of (a) and (b), but insoluble in (b) solely; the relative quantities of components (a), (b) and (c) being such that when flow is terminated in the nozzles and a portion of component (a) evaporates, a concentration of components (b) and (c) builds up in the nozzles, thereby causing component (c) to migrate further within the nozzles into an environment in which an affinity for component (c) is greater, in which said component (a) is selected from the group consisting of methyl ethyl ketone, ethyl acetate, ethanol, acetone, propanol, and a combination thereof; in which said component (b) is selected from the group consisting of one or more hygroscopic salts and/or one or more low- or very low-volatile or hygroscopic organic or hygroscopic inorganic components including water, polyhydric alcohols, glycol ethers, ethanolamines, amides, calcium chloride and magnesium chloride; and in which said component (c) is selected from the group consisting of one or more organic and/or inorganic pigments and/or dyes or any other colour-generating component.

2. The method according to claim 1, in which the component (b) is selected from the group consisting of calcium chloride and water, glycerol and water, triethanolamine, mono-ethyleneglycol and water, formamide and water, and a combination thereof.

3. The method according to claim 2, in which the ink composition contains a binder selected from the group consisting of one or more polymers and/or resins which are soluble and/or dispersible in a mixture of the components (a), (b) and (c), selected from the group consisting of poly-(ethyleneglycol), acrylates poly(vinylacetate) , nitrocellulose, poly(vinylalcohol) , and a combination thereof.

4. A method of preventing clogging of nozzles in ink jet printers during intervals when no ink flows through the nozzles, which comprises the steps of:

providing an essentially non-absorbent surface; and applying an ink composition intended for recording permanent information on the essentially non-absorbent surface, said ink composition comprising:

(a) at least one volatile organic solvent;

(b) a non-, or low volatile liquid or solution miscible to a certain extent in said at least one solvent (a), and (c) at least one colorant which is soluble and/or dispersible in a mixture of (a) and (b), but insoluble in (b) solely; the relative quantities of components (a), (b) and (c) being such that when flow is terminated in the nozzles and a portion of component (a) evaporates, a concentration of components (b) and (c) builds up in the nozzles, thereby causing component (c) to migrate further within the nozzles into an environment in which an affinity for component (c) is greater, in which said component (a) is selected from the group consisting of methyl ethyl ketone, ethyl acetate, ethanol, acetone, propanol, and a combination thereof; in which said component (b) is selected from the group consisting of one or more hygroscopic salts and/or one or more low- or very low-volatile or hygroscopic organic or hygroscopic inorganic components including polyhydric alcohols, glycol ethers, ethanolamines, amides, calcium chloride and magnesium chloride; and in which said component (c) is selected from the group consisting of one or more organic and/or inorganic pigments and/or dyes or any other colour-generating component.

5. The method according to claim 4, in which the ink composition contains a binder selected from the group consisting of one or more polymers and/or resins which are soluble and/or dispersible in a mixture of the components (a), (b) and (c), selected from the group consisting of poly-(ethyleneglycol), acrylates, poly(vinylacetate), nitrocellulose, poly(vinylalcohol), and a combination thereof.

\* \* \* \* \*